(12) United States Patent
Côté et al.

(10) Patent No.: US 10,602,117 B1
(45) Date of Patent: Mar. 24, 2020

(54) TOOL FOR ONSITE AUGMENTATION OF PAST EVENTS

(71) Applicant: Bentley Systems, Incorporated, Exton, PA (US)

(72) Inventors: Stéphane Côté, Lac Beauport (CA); Marc-Andre Bouvrette, Québec (CA)

(73) Assignee: Bentley Systems, Incorporated, Exton, PA (US)

( * ) Notice: Subject to any disclaimer, the term of this patent is extended or adjusted under 35 U.S.C. 154(b) by 94 days.

(21) Appl. No.: 15/700,742

(22) Filed: Sep. 11, 2017

(51) Int. Cl.
*H04N 5/77* (2006.01)
*H04N 13/156* (2018.01)
*H04N 13/117* (2018.01)
*H04N 13/189* (2018.01)
*H04N 13/204* (2018.01)
*H04N 9/80* (2006.01)
*G06T 7/194* (2017.01)
*H04N 13/00* (2018.01)
*H04N 13/344* (2018.01)

(52) U.S. Cl.
CPC ......... *H04N 13/156* (2018.05); *H04N 13/117* (2018.05); *H04N 13/189* (2018.05); *H04N 13/204* (2018.05); *G06T 7/194* (2017.01); *H04N 13/344* (2018.05); *H04N 2013/0092* (2013.01); *H04N 2213/008* (2013.01)

(58) Field of Classification Search
USPC ......................................... 386/223–224, 248
See application file for complete search history.

(56) References Cited

U.S. PATENT DOCUMENTS

| | | | | |
|---|---|---|---|---|
| 7,719,563 | B2 * | 5/2010 | Richards | G06F 3/04815 348/36 |
| 9,274,595 | B2 * | 3/2016 | Reitan | G06F 3/011 |
| 9,286,711 | B2 | 3/2016 | Geisner et al. | |
| 9,418,438 | B2 * | 8/2016 | Ratcliff | G06K 9/00228 |
| 9,460,561 | B1 * | 10/2016 | Cote | G06T 19/006 |
| 9,536,351 | B1 | 1/2017 | Côté | |
| 9,646,417 | B1 | 5/2017 | Sowadski et al. | |
| 9,646,571 | B1 | 5/2017 | Côté | |
| 9,715,008 | B1 | 7/2017 | Côté et al. | |

(Continued)

OTHER PUBLICATIONS

Han, Jungong, et al., "Enhanched Computer Vision with Microsoft Kinect Sensor: A Review," IEEE Transactions on Cybernetics, vol. 43, No. 5, Oct. 2013, pp. 1318-1334.

(Continued)

*Primary Examiner* — Nigar Chowdhury
(74) *Attorney, Agent, or Firm* — Cesari and McKenna, LLP; James A. Blanchette

(57) ABSTRACT

In one embodiment, at an initial time, a capture system records a 3D video stream and an audio stream of a first user interacting with the physical environment. A processing device receives the 3D video stream and the audio stream, isolates the first user from the physical environment, and stores at least a portion of the isolated representation and a portion of the audio stream. At a subsequent time, a second user uses a camera of an augmented reality device to capture a scene. The augmented reality device loads the portion of the isolated representation of the first user and the portion of the audio stream, aligns the 3D video stream with the captured scene, and calculates a pose of the augmented reality device. The augmented reality device then produces an augmented scene, which is displayed to the second user while the portion of the audio stream is played back.

22 Claims, 8 Drawing Sheets

(56) References Cited

U.S. PATENT DOCUMENTS

| | | | |
|---|---|---|---|
| 9,728,007 B2* | 8/2017 | Hakkarainen | H04N 5/23293 |
| 10,078,917 B1* | 9/2018 | Gaeta | G06T 19/006 |
| 2003/0210228 A1 | 11/2003 | Ebersole et al. | |
| 2011/0141141 A1 | 6/2011 | Kankainen | |
| 2011/0164030 A1 | 7/2011 | Gay et al. | |
| 2012/0269494 A1 | 10/2012 | Satyanarayana et al. | |
| 2013/0016123 A1* | 1/2013 | Skarulis | G09G 5/00 345/633 |
| 2013/0257720 A1* | 10/2013 | Noda | G06F 3/017 345/157 |
| 2013/0329985 A1* | 12/2013 | Helin | H04N 13/111 382/154 |
| 2015/0172627 A1* | 6/2015 | Lee | G06T 7/11 348/44 |
| 2015/0229838 A1* | 8/2015 | Hakim | H04N 5/23293 348/333.02 |
| 2019/0124316 A1* | 4/2019 | Yoshimura | H04N 13/361 |

OTHER PUBLICATIONS

Marchand, Eric, et al., "Pose Estimation for Augmented Reality: A Hands-On Survey," IEEE Trans. on Visualization and Computer Graphics, Institute of Electrical and Electronics Engineers, vol. 22, No. 12, Dec. 1, 2016, pp. 2633-2651.

U.S. Appl. No. 13/945,552, filed Jul. 18, 2013 by Stéphane Côté et al. for Dynamic and Selective Model Clipping for Enhanced Augmented Hypermodel Visualization, pp. 1-33.

U.S. Appl. No. 15/091,796, filed Apr. 6, 2016 by Stéphane Côté et al. for Tool for Accurate Onsite Model Visualization That Facilitates Environment Interaction, pp. 1-29.

U.S. Appl. No. 15/485,207, filed Apr. 11, 2017 by Stéphane Côté for On-Site Visualization and Modeling Using P&ID Drawings and Augmented Reality, pp. 1-38.

\* cited by examiner

TOOL FOR ONSITE AUGMENTATION OF PAST EVENTS

BACKGROUND

Technical Field

The present disclosure relates to augmented reality, and more specifically to uses of augmented reality for knowledge sharing.

Background Information

It is commonplace in industry for workers to accumulate significant knowledge about the daily tasks they perform. For example, in an industrial plant, an experienced worker may have accumulated detailed knowledge about various repair and maintenance procedure over their years on the job. While ideally the experienced worker will convey this knowledge to new employees, this may not always be the case.

Typically, a new employee is asked to "shadow" an experienced worker, for example, walking around the industrial plant with them and observing the experienced work while he or she performs tasks and verbally explains what they are doing. The new employee may ask questions, change their viewpoint to better observe tasks and otherwise interactively learn. Yet such "face-to-face" knowledge transfer is not always practical or even possible. For example, an experienced worker may unexpectedly leave the company, so that the knowledge they have accumulated is lost. Further, even if the experienced worker is still with the company, the they may not be available for training others. The experienced worker may work different hours than a new employee, or they may be so busy with day-to-day tasks they do not have time to explain tasks to new employees, especially if there is a large number of new employees successively hired. The end result may be that less knowledge is actually transferred than desirable.

One approach to these issues has been to record an experienced work on video performing and explaining tasks. The time demands on the experienced worker are decreased, as one video can be repeatedly used with multiple new employees, while new employees can receive the knowledge at their own convenience. However, conventional videos have limitations. Conventional videos do not provide context, such that a new employee watching the video needs to determine visual correspondence between what is shown in the video and the physical environment. For example, while the video may show an experienced worker and a background scene depicting a part of a plant, the new worker must be familiar enough with the plant to know where that part of the plant is, and from what perspective it is being shown, in order to determine the proper context of the experienced worker's actions. Second, conventional videos are not interactive. For example, conventional videos typically present fixed viewpoints. Unlike when being taught face-to-face, where the new employee can walk around to obtain a better/different viewpoint for understanding the task being explained to them, when viewing a video they have no choice of viewpoint, and must view the content from the perspective from which it was recorded. If a new employee watching the video cannot readily see something from that perspective, learning may be limited. Likewise, conventional videos typically do not allow one to ask questions. If a new employee only has one specific question, they may need to watch an entire video to try to find the answer. Further, they may watch the entire video only to find that the question was never answered.

Accordingly, there is a need for new techniques for knowledge transfer.

SUMMARY

An augmented reality application is provided that generates onsite augmentations of past events, enabling asynchronous, context-dependent, interactive knowledge transfer. In one embodiment, at an initial time, a capture system having at least a depth-sensing camera and a microphone records a three-dimensional (3D) video stream and an audio stream of a first user (e.g., an experienced worker) explaining and interacting with the physical environment. A processing device receives the 3D video stream and the audio stream, and isolates a foreground of the 3D video stream that represents the first user from a background of the 3D video stream that represents the physical environment, and stores at least a portion of the isolated representation of the first user and a portion of audio stream on a storage device. At a subsequent time, a second user (e.g., a new employee) brings an augmented reality device to a location proximate where the recording previously occurred, and uses a camera of the augmented reality device to capture the scene. An augmented reality application executing on the augmented reality device loads the portion of the isolated representation of the first user and the portion of the audio stream, aligns the 3D video stream with the captured scene, and calculates a pose of the augmented reality device. Based on the aligning and calculating, the augmented reality application augments the portion of the isolated representation of the first user into the captured scene to produce an augmented scene that is displayed to the second user, on a display device of the augmented reality device, and plays back the portion of the audio stream, to reproduce the past event involving the first user.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The application refers to the accompanying drawings of example embodiments, of which.

DETAILED DESCRIPTION

Figure 1:
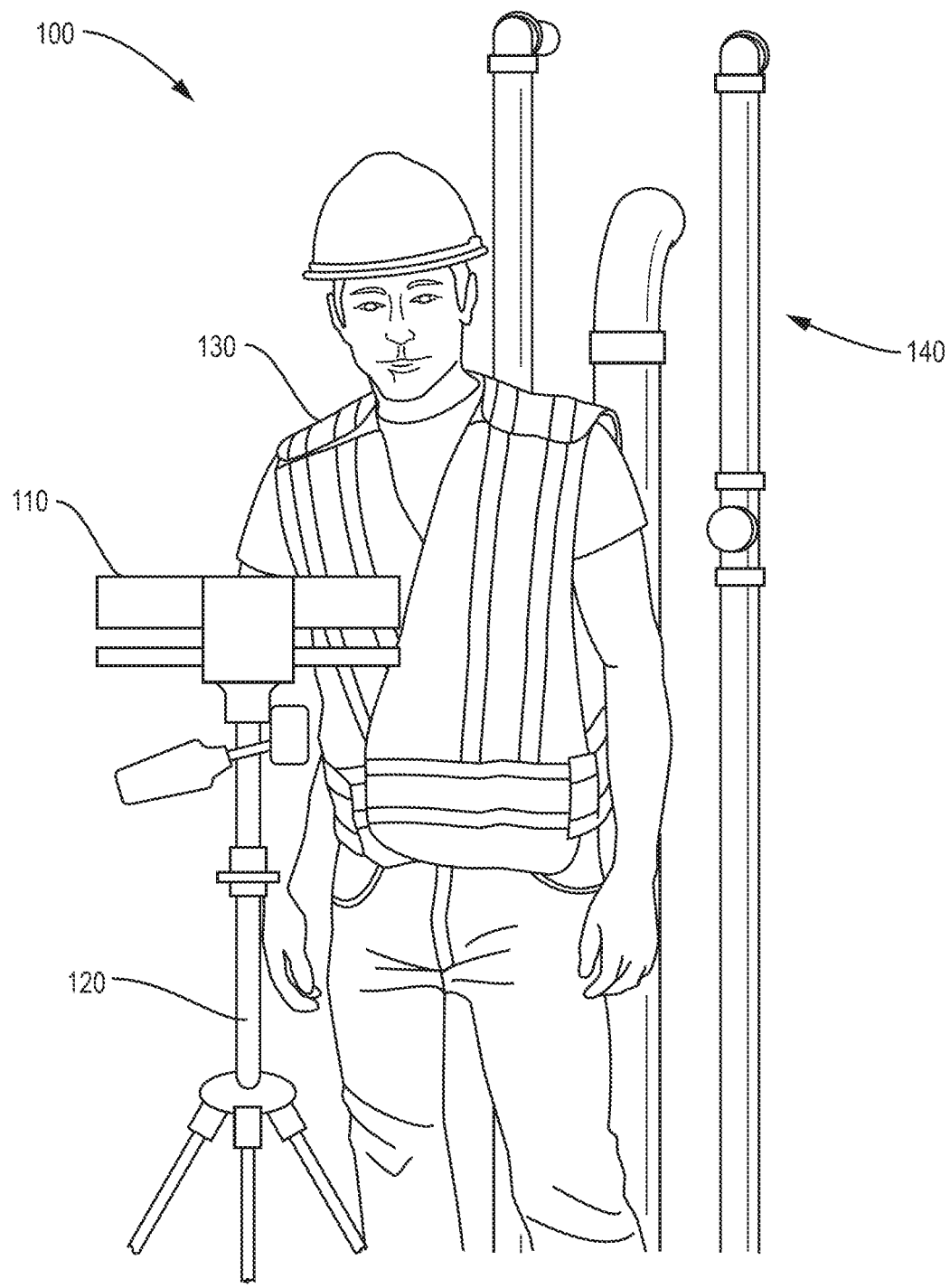
FIG. 1 is a diagram of an example capture system for recording a 3D video stream and an audio stream of a first user (e.g., an experienced worker) explaining and interacting with the physical environment (e.g., equipment of a plant)

FIG. 1 is a diagram of an example capture system 100 for recording a 3D video stream and an audio stream of a first user (e.g., an experienced worker) explaining and interacting with the physical environment (e.g., equipment of a plant, here specifically a pipe system which requires a temperature sensor replacement) 140. The system 100 comprises a sensor device 110 that includes at least a depth-sensing camera and a microphone, which may be mounted on a tripod 120 proximate to the location where the first user 130 interacts with physical environment 140. In one embodiment, the sensor device 110 is a Kinect® motion sensing input device available from Microsoft Corp. In such an embodiment, the depth-sensing camera may be a RGB-D camera that includes an RGB image sensor that captures an image stream, an infrared (IR) emitter that emits IR light beams, and an IR depth sensor that reads the IR beams reflected back to the sensor, which are then converted to into a depth stream. Collectively the image stream and the depth stream may form a 3D video stream, which may take the form of a 3D point cloud. It should be remembered however, that the depth sensing camera may take other forms. For example, the depth sensing camera may be a pair of cameras that capture the scene in 3D stereo.

The microphone may be a microphone array, which contains multiple microphones for capturing an audio steam and potentially locating the source of the audio based on the direction of audio waves. A 3-axis accelerometer may also be included for determining a current orientation of the sensor device 110. In some implementations, the sensing device 110 may be equipped with a motorized mounting system to the tripod 120 that may enable it to rotate horizontally and vertically (yaw and pitch) in response to commands. Such a motorized mounting system may be used to maintain the first user in a field of view of the depth sensing camera if the first user moves (e.g., walks about) while the 3D video stream and audio stream are being captured.

Figure 2:
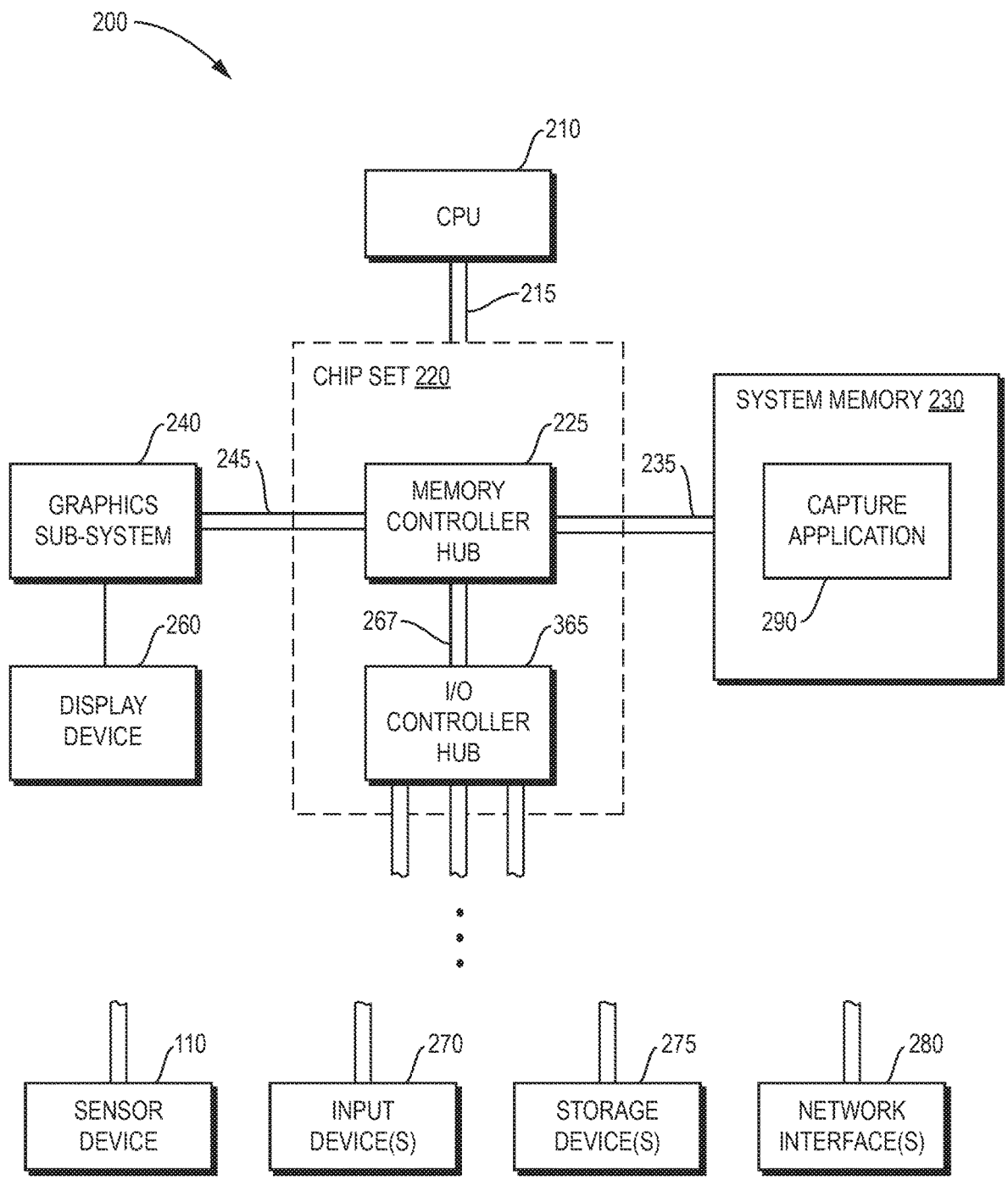
FIG. 2 is a block diagram of an example processing device (e.g., a computer) of a capture system that may execute a capture application.

The sensor device 110 is coupled by a bus, for example a universal serial bus (USB) cable, to a processing device (not shown in FIG. 1), which may be a computer executing a capture application. FIG. 2 is a block diagram of an example processing device 200 (e.g., a computer) of the capture system 100 that may execute a capture application 290. The processing device includes a central processing unit (CPU) 210 that may be coupled to a chipset 220 by a front side bus 215. The chipset 220 includes a memory controller hub 225 that is responsible for communications with high-speed devices such as system memory 230 and a graphics subsystem (e.g., a graphics card) 240. The memory controller hub 225 is coupled to the system memory 230 by a high-speed memory bus 235. The system memory 230 is typically volatile memory, such as a Random Access Memory (RAM), which is adapted to store a wide range of software and data being actively used by the CPU 110. The memory controller hub 225 is coupled to a graphics subsystem (e.g., a graphics card) by 240 a high-speed graphics bus 245. The graphics subsystem 240 includes a GPU and graphics memory, among other components coupled to a display device 260.

The chipset 220 further includes an input/output controller hub 265 coupled to the memory controller hub by an internal bus 267. Among other functions, the input/output controller hub 265 may support a variety of types of peripheral buses, such as a peripheral component interconnect (PCI) bus, a USB bus, and/or a Serial Advanced Technology Attachment (SATA) bus, for connecting, for example, to the sensor device 110 and other components, such as one or more input devices 270 (e.g., a keyboard, a mouse, etc.), one or more persistent storage devices 275, (e.g., a hard disk drive, a solid-state drive, or another type of persistent data store), one or more network interfaces 280 (e.g., an Ethernet interface or a Wi-Fi adaptor), etc. The network interface(s) 280 may allow communication with other processing devices over a computer network, such as the Internet, to enable various types of collaborative, distributed, or remote computing.

Working together, the components of the processing device 200 (and other processing devices in the case of collaborative, distributed, or remote computing) may execute a capture application 290 persistently stored in storage devices 275 and loaded into memory 230 when needed. The capture application 290 may utilize a motion sensing input device software development kit (SDK) (e.g., a Kinect for Windows® SDK) that includes functionality for processing the 3D video stream and audio stream from the sensor device 110, generating therefrom an isolated representation of the first user for use in augmentations and, and persistently storing such isolated representation, along with the audio stream, to one of the storage devices 275.

Figure 3:
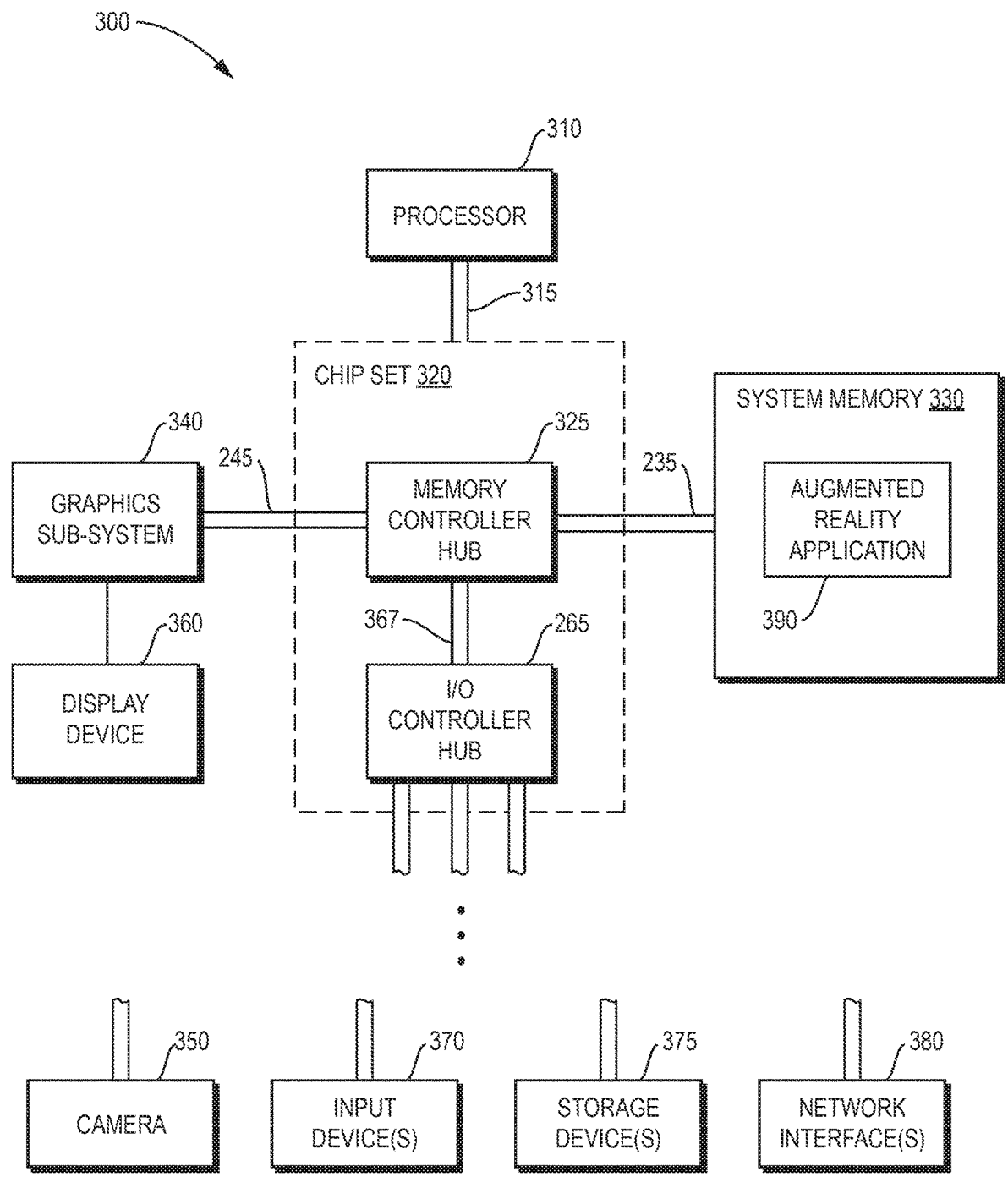
FIG. 3 is a block diagram of an example augmented reality device that may be used to generate onsite augmentations of past events.

At a subsequent time, the persistently stored representation of the first user and the audio stream may be used by an augmented reality device to generate onsite augmentations of past events that convey knowledge of the first user to a second user (e.g., a new employee). FIG. 3 is a block diagram of an example augmented reality device 300 that may be used to generate onsite augmentations of past events. The augmented reality device 300 may be a head-mounted display unit (such as the HoloLens® head-mounted display unit available from Microsoft Corp.), a tablet computer (such as the Tango® augmented-reality enabled tablet available from Google Inc.), or another type of mobile computing device. The augmented reality device 300 includes processing unit 310 that may be coupled to a chipset 320 by a front side bus 315. The chipset 220 includes a memory controller hub 325 that is responsible for communications with high-speed devices such as system memory 330 and a graphics subsystem 340. The memory controller hub 325 is coupled to the system memory 330 by a high-speed memory bus 335. The system memory 330 is typically volatile memory, such as a Random Access Memory (RAM), which is adapted to store a wide range of software and data being actively used by the processor 310. The memory controller hub 325 is coupled to a graphics subsystem 340 by a high-speed graphics bus 345 that is coupled to at least one display device 360 (e.g., a stereoscopic optical see-through head-mounted display, a touch screen panel, etc.) that is capable of showing an augmented reality view. The chipset 320 further includes an input/output controller hub 365 coupled to the memory controller hub by an internal bus 367. Among other functions, the input/output controller hub 365 may support a variety of types of peripheral buses for connecting, for example, to a camera 350 (e.g., a RGB-D depth-sensing camera, a RGB video camera, etc.), and other components, such as one or more input devices 370 (e.g., a thumb-sized finger-operated "clicker", a touch sensor, a sensor for detecting hand gestures, a microphone for detecting voice commands, etc.), one or more persistent storage devices 375 (e.g., a flash memory, or another type of persistent data store), one or more network interfaces 380 (e.g., a Wi-Fi adaptor), etc. The network interface(s) 380 may communicate with the processing device 200 to receive at least portions of the isolated representation of the first user from the 3D video stream, and at least portions of the audio stream, and such information may be locally cached in storage devices 375 until needed.

Working together, the components of the augmented reality device 300 may execute an augmented reality application 390 persistently stored in storage devices 375 and loaded into memory 330 when needed. The augmented reality application 390 may utilize a scene (e.g., RGB video) captured by the camera 350, together with an isolated representation of the first user from the 3D video stream to produce an augmented reality view, which is played back together with the portion of the audio stream to recreate the first user (e.g., the experienced worker's) explaining and interacting with the physical environment (e.g. equipment of a plant) 140, to enable knowledge transfer to a second user (e.g., a new employee).

Figure 4:
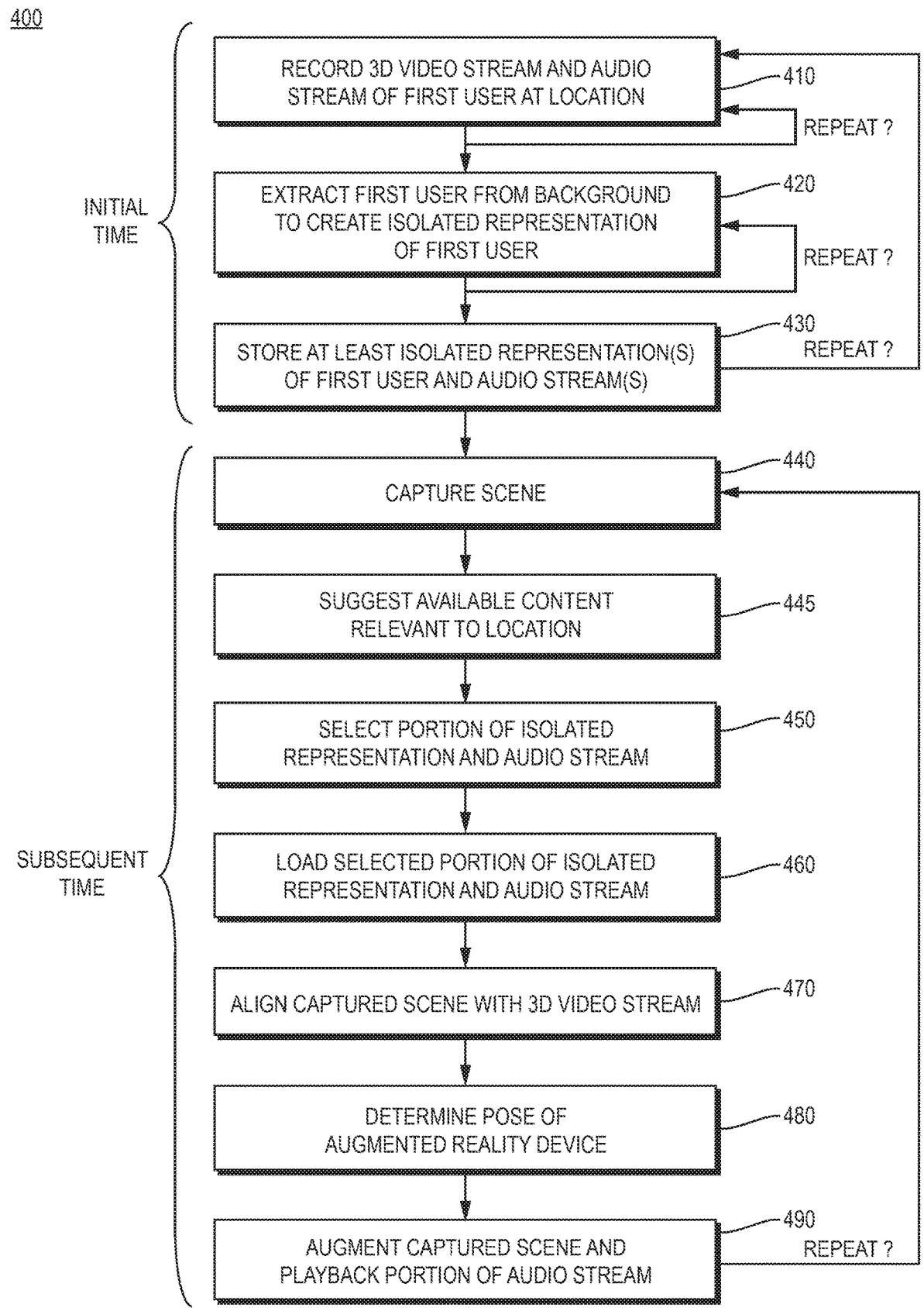
FIG. 4 is a high level flow diagram of an example sequence of steps for onsite augmentation of past events.

FIG. 4 is a high level flow diagram of an example sequence of steps 400 for onsite augmentation of past events. At step 410, at an initial time, the depth-sensing camera (e.g., RGB-D camera) of the capture system 100 records a 3D video stream (e.g., a 3D point cloud) and the microphone (e.g., microphone array) of the capture system records an audio stream, of the first user (e.g., the experienced worker) explaining and interacting with the physical environment (e.g. equipment of a plant) 140 at a location. The first user may select a position at which to place the capture system 100. For example, a position may be selected such that the field of view of the depth-sensing camera can accommodate both the first user and the relevant part of the physical environment being discussed. In some implementations, recording may be started before the first user enters the field of view, to capture a baseline frame that includes the physical environment without the first user, and then the first user may enter the field of view, so that subsequent fames also include the first user. Then, the first user enters the field of view of and explains and interacts with a part of the physical environment (e.g., pointing to it, touching it, or even operating it) to convey knowledge. The first user may answer a number of discrete questions, and the answers to such may be stored as separate portions of the 3D video stream and audio stream, for eventual use as separately displayable augmentations. Step 410 may be repeated one or more times with the position of the capture system 100 changed, to facilitate capture of hard to see areas of the physical environment as the user explains and interacts with them. Such separate recordings may be maintained as separate portions of the 3D video stream and audio stream, or as portions of independent 3D video streams and audio streams.

Figure 5:
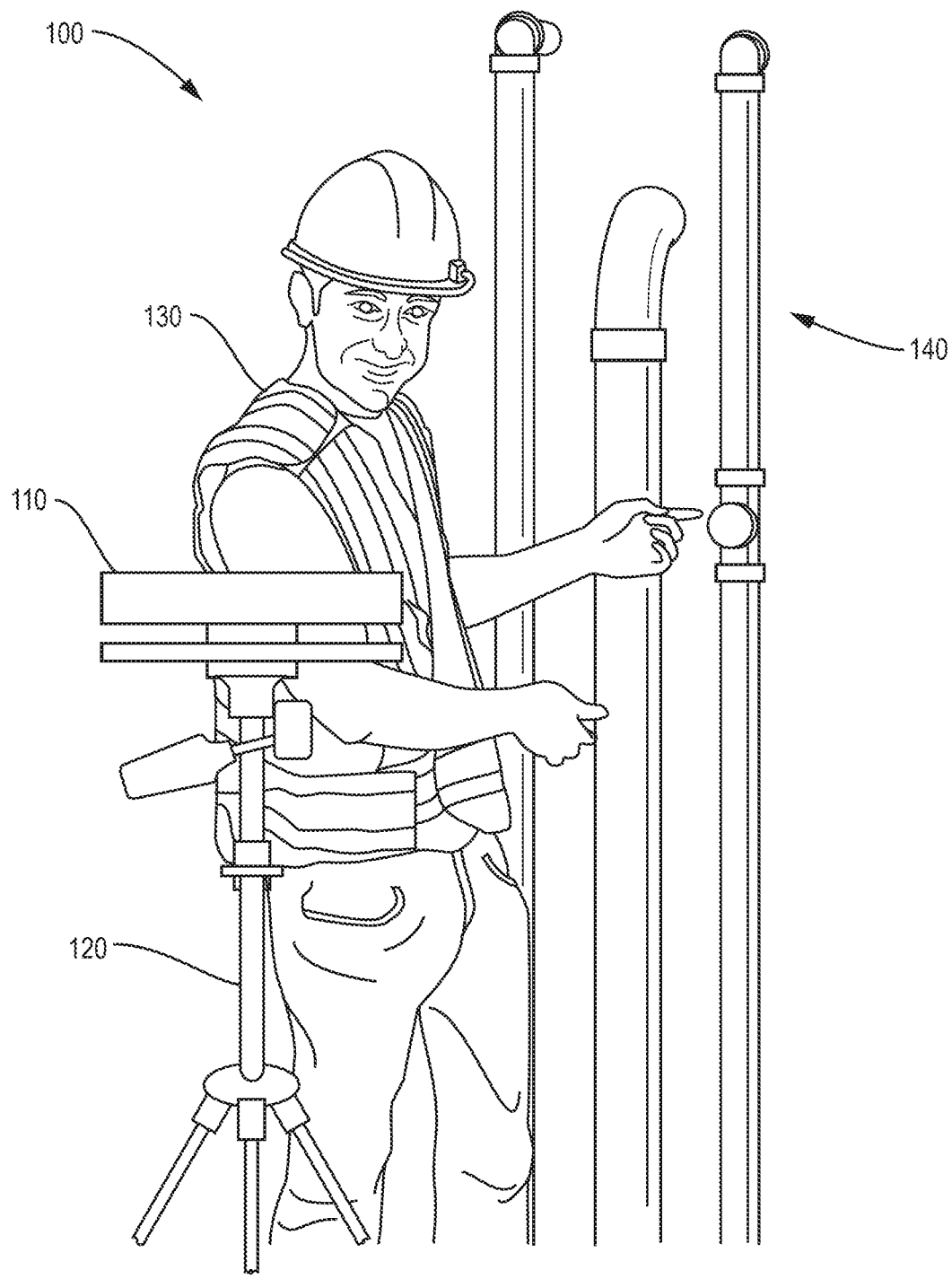
FIG. 5 is a diagram of an example first user explaining and interacting with a part of the physical environment (here pointing to a temperature sensor of a pipe system) at an initial time.

FIG. 5 is a diagram 500 of an example first user explaining and interacting with a part of the physical environment (here pointing to a temperature sensor 550 of a pipe system) at an initial time, as part of step 410 of FIG. 4. The user interaction and explanation may be captured as a portion of a 3D video stream and a portion of an audio stream.

The 3D video stream(s) and audio stream(s) from step 410 are received at the capture application 290 executing on the processing device 200. At step 420, the capture application extracts the first user from the background of each available 3D video stream, isolating a foreground of the 3D video stream that represents the first user from the physical environment. Such step may be performed a number of different ways. In one implementation, if a baseline frame is available, the capture application 290 may subtract the baseline frame from the subsequent frames to produce the isolated representation of the first user. Where the 3D video steam is a 3D point cloud, any of a number of known point cloud subtraction/change detection algorithms may be utilized. In another implementation, any of a number of known human detection algorithms may be utilized to determine a foreground of the 3D video stream that represents the first user (e.g., based on body shape, body movement, skin tone, and/or other visual indicators) and separate the representation of the first user from a background of the 3D video stream that represents the physical environment. Step 420 may be repeated for each portion of the 3D video stream, for example, to generate a series of isolated representations of the first user that relate to different questions or that have been recorded with the capture system 100 at different positions about the location that is being explained.

Figure 6:
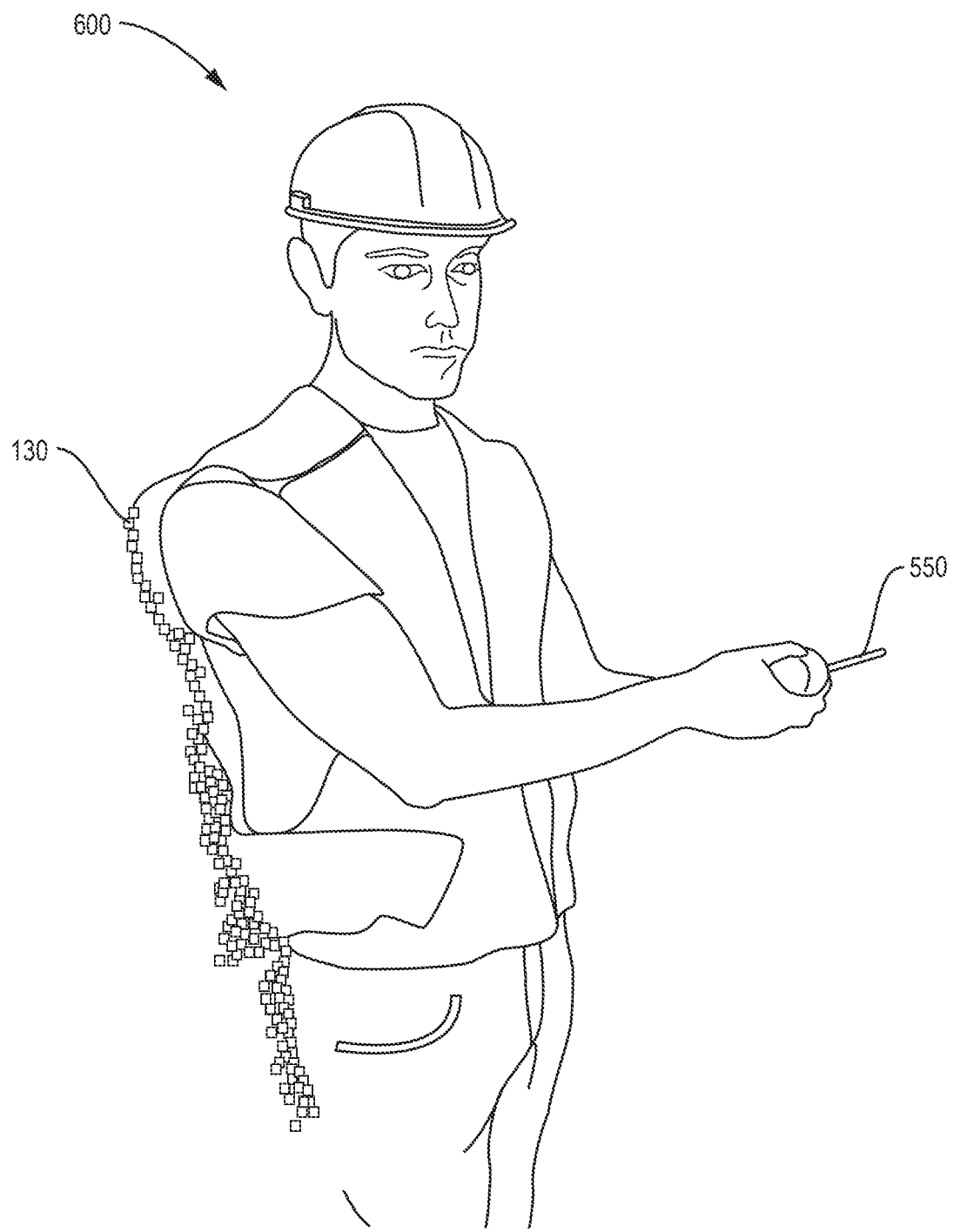
FIG. 6 is an example frame of a 3D video stream showing an isolated representation of a first user (here shown extracting a temperature sensor from a pipe system for replacement), and the background removed.

FIG. 6 is an example frame 600 of a 3D video stream showing an isolated representation of a first user (here shown extracting a temperature sensor 550 from a pipe system for replacement), and the background removed, that may be produced as part of step 420 of FIG. 4. In this example, the 3D video stream was originally recorded as a 3D point cloud, which has been converted into a 3D mesh, such that the isolated representation of the first user is a 3D mesh of the first user. However, it should be understood that the isolated representation may take any of a number of different forms.

At step 430, for each portion of the 3D video stream(s) and portion of the audio stream(s) that relate to a different question or that have been recorded with the capture system 100 at a different position, the capture application 190 stores them to a storage device 375. Each isolated representation of the first user and relevant portion of the audio stream may be stored in a different file, indexed within the same file, or otherwise maintained in an individually accessible manner. For an implementation that uses baseline frames, any baseline frames may also be stored to the storage device 375, as part of the same file or separately. Steps 410-430 may be repeated to record the first user explaining and interacting with part of the physical environment at a plurality of different locations.

At a subsequent time, a second user (e.g., a new employee) brings an augmented reality device 300 proximate to a location in the physical environment for which there is recorded content. At step 440, the augmented reality device's camera 350 captures the scene proximate the location. The captured scene may be 3D video captured by a RGB-D depth-sensing camera, or may take another form. At step 450, in response to user input, a portion of the isolated representation of the first user and a portion of the audio stream is selected for the location. In some implementations, the augmented reality device 300 may provide a user interface (e.g., a voice-based interface, a menu based interface, etc.) in which the user may select from predetermined questions related to the location for which recorded content is available, or ask free form questions related to the location that are matched against available recorded content.

At step 460, the augmented reality device 300 loads the selected portion of the isolated representation of the first user and the portion of the audio stream (e.g., over a Wi-Fi network connecting the augmented reality device 300 to the processing device 200, or from content already cached in the storage device 375 of the augmented reality device). For an implementation that uses baseline frames, a related baseline frame may also be loaded.

At step 470, the augmented reality application 390 aligns the captured scene with the 3D video stream of which the isolated representation of the first user is a part. Such step may be performed a number of different ways. In one implementation, in which a baseline frame is available, and the camera 350 of the augmented reality device 300 is a depth-sensing camera, a 3D frame from the augmented reality device is matched against the baseline frame using a mesh or point cloud alignment algorithm (e.g., an iterative closest point (ICP)) algorithm). In another implementation, a feature-based alignment algorithm may be utilized, where the augmented reality application 390 determines a plurality of features in the scene and the 3D video stream, and matches the plurality of features in the scene and the 3D video stream to determine alignment there between.

At step 480, the augmented reality application 390 determines a pose of the augmented reality device 300. Pose may be determined using any of a number of known pose-detection algorithms that rely upon feature-based pose estimation, data from a separate a tracking system, user-reported data, etc.

Then, at step 490, based on the alignment determined in step 470 and the pose determined in step 480, the augmented reality application 390 augments the portion of the isolated representation of the first user into the captured scene and the resulting augmented scene is displayed on the augmented reality device 300 to the second user (e.g., on a traditional screen, a head-mounted display, etc.). The representation of the first user is augmented into the scene such that the first user appears at the same position they were in the past, when explaining and interacting with part of the physical environment. Simultaneously to the augmenting, the related portion of the audio stream is played back.

During augmentation and audio playback, the second user may freely move about the physical environment (with execution looping back to step 370 to update pose), to view the augmentation and the part of the physical environment being interacted with from different positions. Further the augmentation and audio playback may be paused, or terminated before completion, in response to input by the second user. Once the second user is satisfied with the knowledge transfer for the location, the second user may bring the augmented reality device 300 proximate to another location in the physical environment, and view additional available content (with execution looping back to step 440 to capture a new scene).

Figure 7:
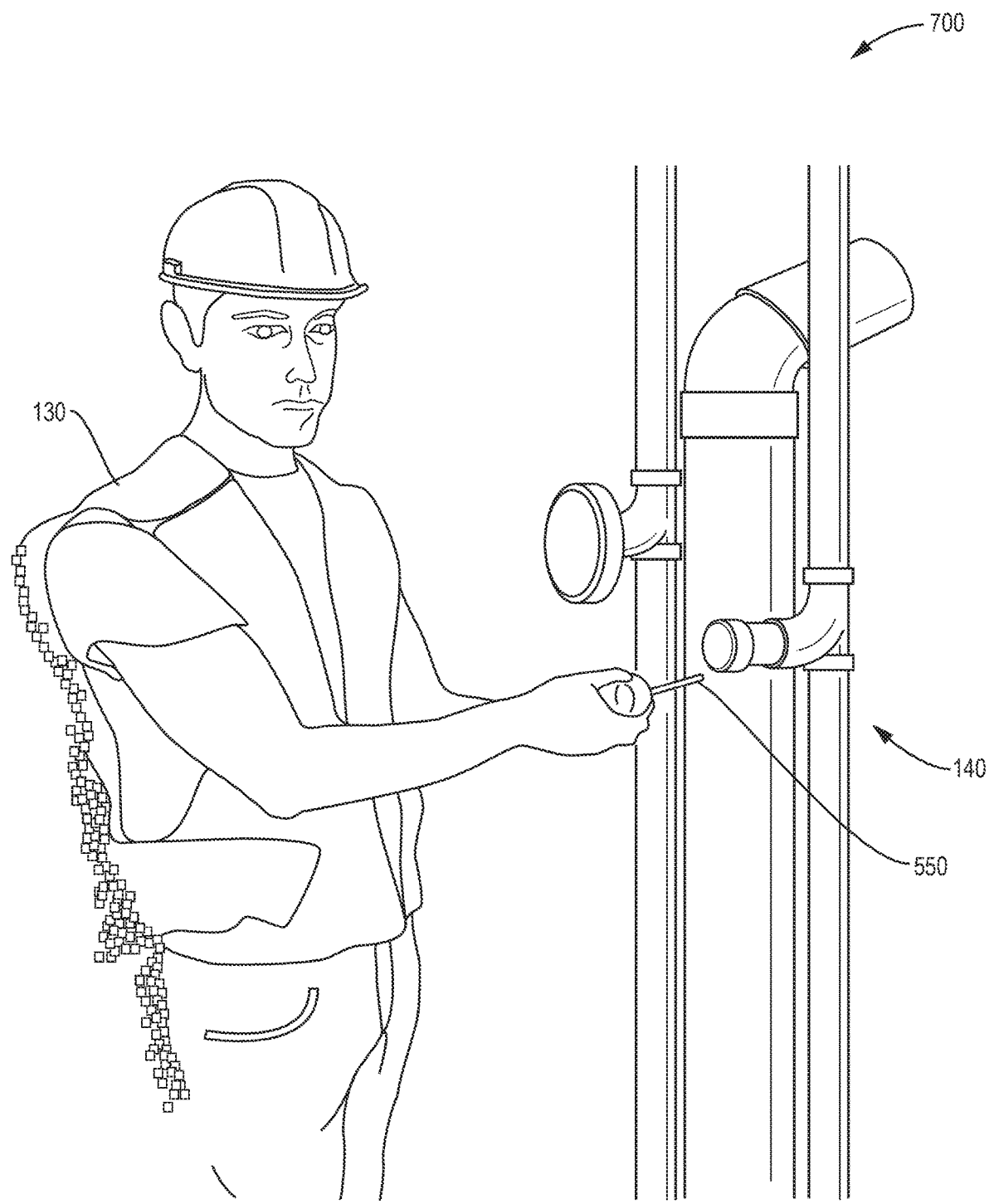
FIG. 7 is an example view of an augmented scene that may be displayed on an augmented reality device to a second user to replay the example explanations and interactions of a first user (here extracting a temperature sensor of a pipe system for replacement)
Figure 8:
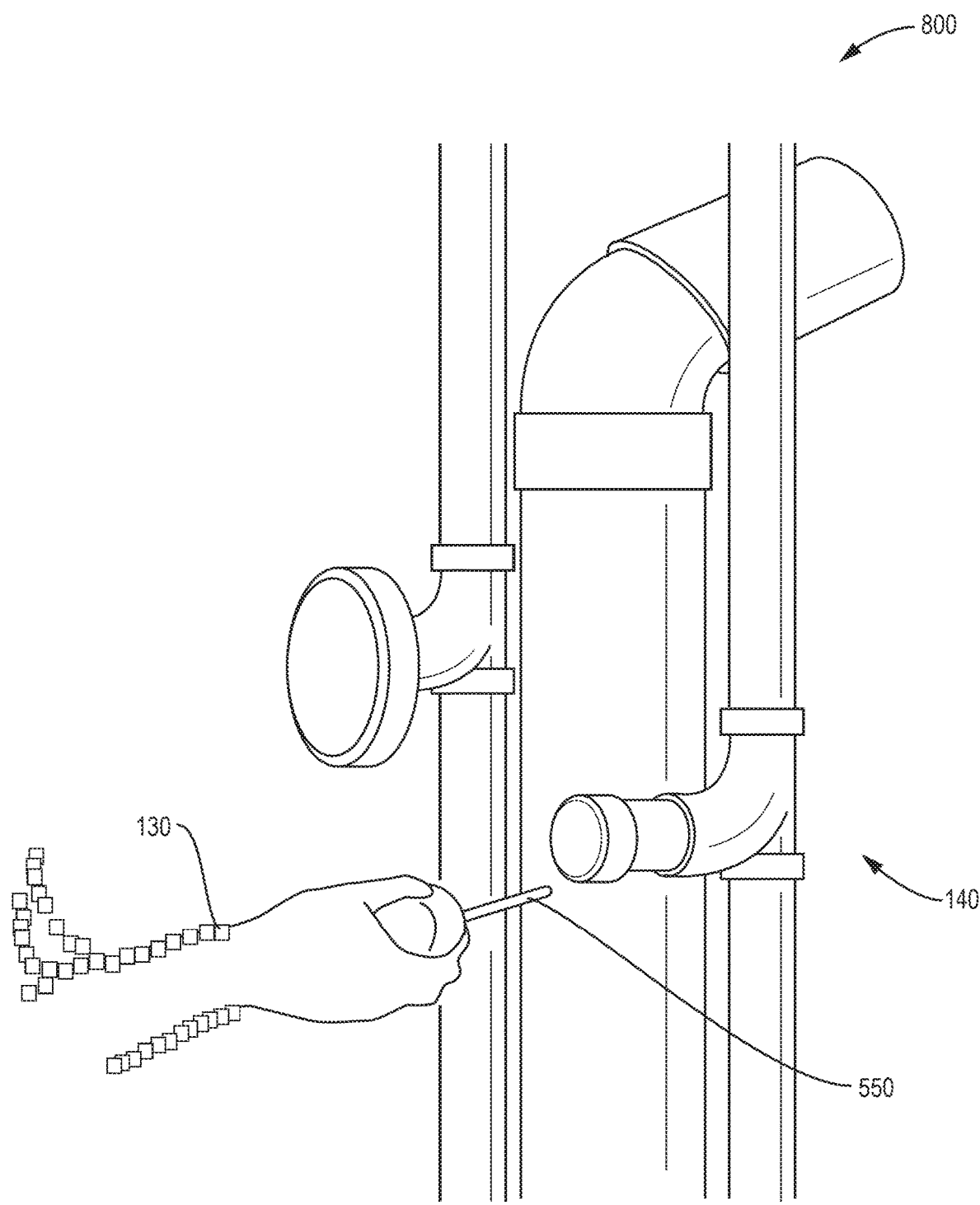
FIG. 8 is an example view of an augmented scene that may be displayed on an augmented reality device, showing the same interaction as FIG. 7, but from a closer position (e.g., so that detail of the temperature sensor being extracted is better visible).

FIG. 7 is an example view 700 of an augmented scene that may be displayed on the augmented reality device 300 to a second user as part of step 490 of FIG. 4, to replay the example explanations and interactions of a first user with (here extracting a temperature sensor of a pipe system for replacement). As mentioned above, the second user may move about to view the interaction from a different position (e.g., so they may have a better view). FIG. 8 is an example view 800 of an augmented scene that may be displayed on an augmented reality device 300 to a second user as part of step 490 of FIG. 4, showing the same interaction as FIG. 7, but from a closer position (e.g., so that detail of the temperature sensor being extracted is better visible).

In conclusion, while the above description discusses example techniques for generating onsite augmentations of past events, it should be understood that a number of modifications and/or additions may be made without departing from the disclosure's intended spirit and scope. While examples are provided above of the techniques being used in an industrial plant to transfer knowledge from an experienced worker to a new employee. It should be understood that the techniques may be used in a variety of other settings for other purposes. For example, the techniques may be used in the context of sports, to allow users to view past sporting events from different vantage points. In such a context, the first user who is recorded may be a player of the sporting event (e.g., a player at the US Open). The second user may be fan, for example, who is attending a venue that includes the actual field, court, etc. where the sporting event previously took place, or a substantially identical field, court, etc. (e.g., the International Tennis Hall of Fame which includes several regulation tennis courts). The past sporting event may be played back, allowing the second user (e.g., fan) to view the event from different vantage points (e.g., the position of the opponent, positioned looking down the sideline, etc.). In addition to entertainment for fans, such an application may be used for training and coaching purposes (e.g., to illustrate techniques used in specific parts of the match).

In another example, the techniques may be used in the context of security surveillance, to allow investigators to better understand events. In such a context, the first user who is recorded may be a subject (e.g., a suspected murderer). The second user may be a law enforcement officer, for example, who is attempting to determine what occurred at a crime scene. The events at the scene may be played back, allowing the second user (e.g., the law enforcement officer) to view the events from different vantage points to better understand what occurred (e.g., from the perspective of the subject to see what they were aiming at). It should be understood that there are many other applications of the above techniques, and these are but a few examples.

Further, it should be understood that many of the above discussed techniques may be implemented in software, in hardware, or in a combination thereof. A software implementation may include electronic device-executable instructions stored in a non-transitory electronic device-readable medium, such as a volatile or persistent memory, a hard-disk, a compact disk (CD), or other storage medium. A hardware implementation may include specially configured processors, application specific integrated circuits (ASICs), and/or other types of hardware components. Further, a combined software/hardware implementation may include both electronic device-executable instructions stored in a non-transitory electronic device-readable medium, as well as one or more specially configured hardware components. Above all, it should be understood that the above descriptions are meant to be taken only by way of example.

What is claimed is:

1. A method for generating onsite augmentations of past events, comprising:
   at an initial time,
      recording, by a depth-sensing camera and a microphone of a capture system, a three-dimensional (3D) video stream and an audio stream of a first user interacting with the physical environment,
      isolating a foreground of the 3D video stream that represents the first user at the initial time from a background of the 3D video stream that represents the physical environment, and storing at least a portion of the isolated representation of the first user at the initial time and a portion of the audio stream on a storage device; at a subsequent time, capturing, by a camera of an augmented reality device, a scene, loading the portion of the isolated representation of the first user at the initial time and the portion of the audio stream, aligning the 3D video stream with the captured scene, calculating a pose of the augmented reality device, and based on the aligning and calculating, augmenting the portion of the isolated representation of the first user at the initial time into the captured scene at the subsequent time to produce an augmented scene that is displayed on a display device of the augmented reality device, and playing back the portion of the audio stream.

2. The method of claim 1, further comprising:

in response to the second user moving the augmented reality device to a different pose, repeating the calculating the pose, and the augmenting, to show the portion of the isolated representation of the first user at the initial time augmented into the captured scene from a different perspective.

3. The method of claim 1, wherein the storing stores a plurality of portions of the isolated representation of the first user at the initial time and a plurality of portions of the audio stream, and the method further comprises, selecting the portion of the isolated representation of the first user at the initial time and the portion of the audio stream based on user input.

4. The method of claim 3, wherein the recording records the first user answering a plurality of questions, the storing separately stores an isolated representation of the first user at the initial time and a portion of audio stream on the storage device that answer each of the questions, the user input is the second user asking a specific question, and the loading loads the portion of the isolated representation of the first user at the initial time and the portion of the audio stream that answers the specific question.

5. The method of claim 4, wherein the user input is voice input.

6. The method of claim 1, wherein the capture system includes a plurality of depth-sensing cameras positioned about the first user to record the first user from multiple directions.

7. The method of claim 6, wherein the 3D video stream includes at least one baseline frame and a plurality of subsequent frames, and the recording further comprises:

capturing the at least one baseline frame to include the physical environment without the first user and capturing the plurality of subsequent frames to include the first user interacting with the physical environment.

8. The method of claim 7, wherein the isolating further comprises:

subtracting the baseline frame from the subsequent frames to produce the isolated representation of the first user at the initial time.

9. The method of claim 7, wherein the storing further comprises:

storing the baseline frame on the storage device.

10. The method of claim 1, wherein the isolating further comprises:

determining the foreground of the 3D video stream that represents the first user with a human detection algorithm; and separating the foreground determined by the human detection algorithm from a remaining portion of the 3D video stream.

11. The method of claim 1, wherein the 3D video stream includes a baseline frame and a plurality of subsequent frames, the captured scene is represented by another 3D video stream, and the aligning further comprises:

matching the baseline frame against a frame of the captured scene using an alignment algorithm.

12. The method of claim 1, wherein the aligning further comprises:

determining a plurality of features in the captured scene and the 3D video stream; and matching the plurality of features in the captured scene and the 3D video stream.

13. A system for generating onsite augmentations of past events, comprising a capture system including a sensor device, having at least a depth-sensing camera, that is configured to record a three-dimensional (3D) video stream of a first user interacting with the physical environment, a processing device, having at least a processor configured to execute a capture application and a storage device, the capture application configured, when executed, to isolate a foreground of the 3D video stream that represents the first user from a background of the 3D video stream that represents the physical environment, and store at least a portion of the isolated representation of the first user to the storage device; and an augmented reality device, having a processor configured to execute an augmented reality application, a camera configured to capture a scene and a display device, the capture application configured, when executed, to load the portion of the isolated representation of the first user from the storage device, align the 3D video stream with the captured scene, calculate a pose of the augmented reality device, and augment the portion of the isolated representation of the first user into the captured scene to produce an augmented scene that is displayed on the display device.

14. The system of claim 13, wherein the augmented reality application is further configured, when executed, to repeat calculation of the pose, augmentation, and display, to show the portion of the isolated representation of the first user augmented into the captured scene from a different perspective.

15. The system of claim 13, wherein the capture application is further configured, when executed, to store a plurality of portions of the isolated representation of the first user from the 3D video stream, and the augmented reality application is further configured, when executed, to select the portion of the isolated representation of the first user that answer a question input by the second user.

16. The system of claim 13, wherein the capture system has a plurality of depth-sensing cameras positioned about the first user to record the first user from multiple directions.

17. The system of claim 13, wherein the 3D video stream includes at least one baseline frame without the first user and a plurality of subsequent frames that include the first user interacting with the physical environment.

18. The system of claim 17, wherein the augmented reality application is further configured, when executed, to subtract the baseline frame from the subsequent frames to produce the isolated representation of the first user.

19. The system of claim 13, wherein the augmented reality application is further configured, when executed, to determine the foreground of the 3D video stream that represents the first user with a human detection algorithm, and separate the foreground determined by the human detection algorithm from a remaining portion of the 3D video stream.

20. The system of claim 13, wherein the 3D video stream includes a baseline frame and a plurality of subsequent frames, the captured scene is represented by another 3D video stream, and the augmented reality application is further configured, when executed, to match the baseline frame against a frame of the captured scene to align the 3D video stream with the captured scene.

21. The system of claim 13, wherein the augmented reality application is further configured, when executed, to determine a plurality of features in the captured scene and the 3D video stream, and match the plurality of features in the captured scene and the 3D video stream to align the 3D video stream with the captured scene.

22. A non-transitory electronic-device readable medium having executable instructions stored thereon, the executable instructions when executed by one or more processors of one or more electronic devices operable to:
  record a three-dimensional (3D) video stream and an audio stream of a first user interacting with the physical environment at an initial time;
  isolate a foreground of the 3D video stream that represents the first user at the initial time from a background of the 3D video stream that represents the physical environment;
  capture a scene at a subsequent time by a camera of an augmented reality device;
  align the 3D video stream with the captured scene;
  augment the portion of the isolated representation of the first user into the captured scene to produce an augmented scene that is displayed to a second user on a display device of the augmented reality device, and play back the portion of the audio stream to the second user.

\* \* \* \* \*